US006803744B1

(12) United States Patent
Sabo

(10) Patent No.: US 6,803,744 B1
(45) Date of Patent: Oct. 12, 2004

(54) ALIGNMENT INDEPENDENT AND SELF ALIGNING INDUCTIVE POWER TRANSFER SYSTEM

(76) Inventor: Anthony Sabo, 1513 N. Ohio St., Arlington, VA (US) 22205

( * ) Notice: Subject to any disclaimer, the term of this patent is extended or adjusted under 35 U.S.C. 154(b) by 81 days.

(21) Appl. No.: 09/702,234

(22) Filed: Oct. 31, 2000

Related U.S. Application Data

(60) Provisional application No. 60/162,295, filed on Nov. 1, 1999.

(51) Int. Cl.[7] .................................................. H02J 7/00
(52) U.S. Cl. ...................................... 320/108; 307/104
(58) Field of Search .......................... 320/108; 307/104, 307/150; 336/40, 118, 119, 130, 131

(56) References Cited

U.S. PATENT DOCUMENTS

| | | | | |
|---|---|---|---|---|
| 4,374,354 A | * | 2/1983 | Petrovic et al. | ............. 320/108 |
| 4,556,837 A | * | 12/1985 | Kobayashi et al. | ......... 320/108 |
| 5,311,973 A | * | 5/1994 | Tseng et al. | ................ 320/108 |
| 5,314,453 A | * | 5/1994 | Jeutter | .......................... 607/61 |
| 5,498,948 A | | 3/1996 | Bruni et al. | |
| 5,536,979 A | * | 7/1996 | McEachern et al. | ........ 307/104 |
| 5,545,191 A | * | 8/1996 | Mann et al. | ................... 607/57 |
| 5,821,728 A | * | 10/1998 | Schwind | ..................... 320/108 |
| 5,821,731 A | | 10/1998 | Kuki et al. | |
| 5,923,544 A | * | 7/1999 | Urano | .......................... 363/22 |
| 6,016,046 A | * | 1/2000 | Kaite et al. | ................. 320/108 |

* cited by examiner

*Primary Examiner*—Gregory J. Toatley, Jr.
(74) *Attorney, Agent, or Firm*—Samuel Shipkovitz; Laubscher & Laubscher

(57) ABSTRACT

An inductive power transfer device is provided for recharging cordless appliances. The device includes a plurality of inductors arranged in an array and connected with a power supply via switches which are selectively operable to activate the respective inductors. The inductors serve as the primary coil of a transformer. The secondary coil of the transformer is arranged in the appliance. When the appliance is arranged proximate to the power transfer device with the respective coils in alignment, power is inductively transferred from the device to the appliance via the transformer.

28 Claims, 4 Drawing Sheets

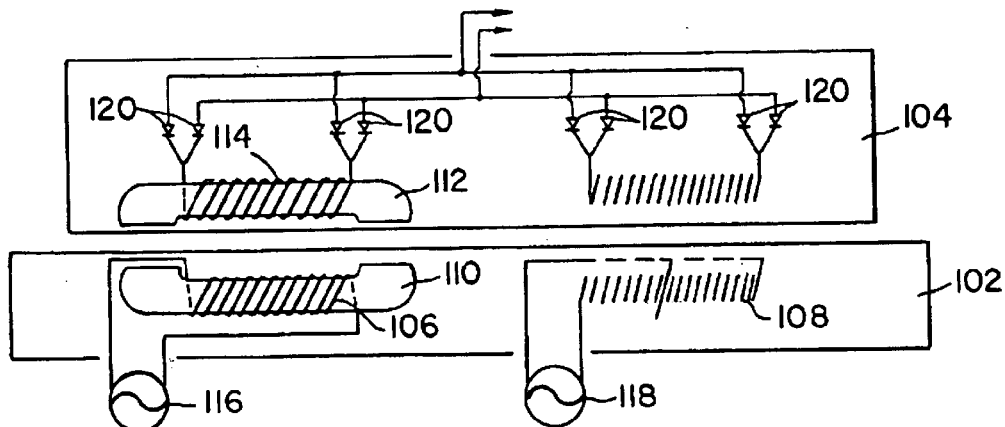
Fig. 7
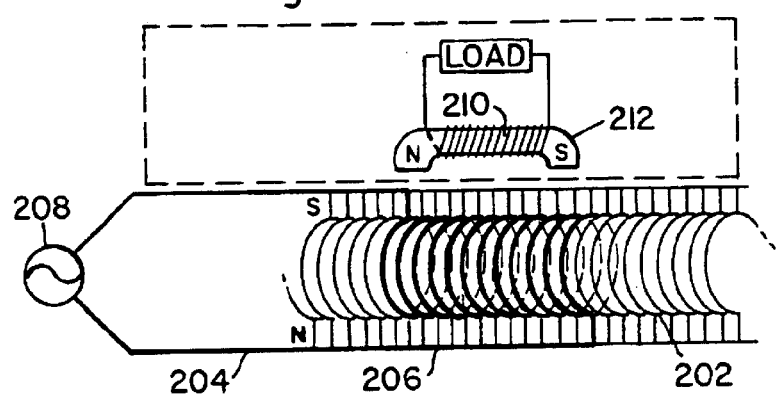
Fig. 8
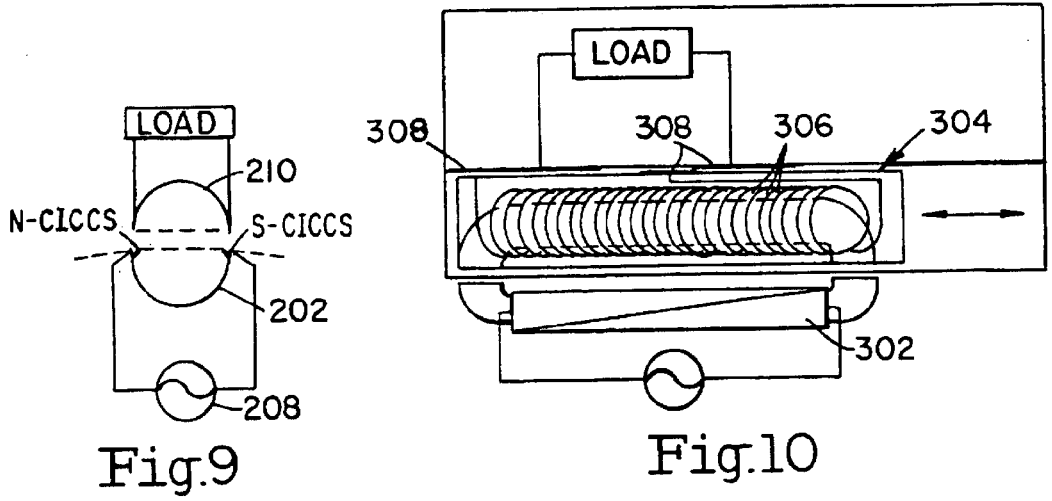
Fig. 9
Fig. 10

ALIGNMENT INDEPENDENT AND SELF ALIGNING INDUCTIVE POWER TRANSFER SYSTEM

This application is based on provisional application No. 60/162,295 filed Nov. 1, 1999.

BACKGROUND OF THE INVENTION

The present invention generally relates to inductive power transfer devices for charging or powering cordless appliances.

Currently, cordless electrically operated devices are charged by a source of electrical energy only when the device and source are connected to one another. Normally, the source includes some sort of pedestal to which the device is connected before charging may occur. The drawbacks of such an arrangement are self-evident. For example, when working with a cordless drill, it is often necessary to mount a battery which must be removed from the drill, or the drill itself, on the charger before the charging process can begin. If the charger is not kept in close proximity, the drill battery must be moved to the charger. The present invention differs significantly from the known prior art wherein the source and devices are specifically matched to only operate when the receiver is mounted on the holder for recharging. The present invention provides a novel system for automatically charging a device whenever it is placed on a rest surface without a direct electrical connection, regardless of the orientation of the device on the surface.

SUMMARY OF THE INVENTION

Accordingly, it is a primary object of the invention to provide an induction power transfer device for an appliance including a housing and a plurality of primary inductors or coils arranged in an array within the housing. A circuit connects the inductors with a power supply and a plurality of switches connect each inductor with the circuit. The switches are operable to selectively activate respective primary inductors so that when an appliance having at least one secondary inductor is placed on the housing, power is transferred to the appliance via a transformer defined by the primary inductors and the secondary inductor.

According to a further embodiment of the invention, at least one of the primary inductors has a longitudinal axis arranged normal to the axes of the other primary inductors.

The housing preferably has a flat top wall beneath which the primary inductors are arranged in a plane parallel to the wall. An appliance placed on the wall has its secondary inductor inductively coupled with at least one of the primary inductors.

According to a further object of the invention either the inductive transformer device or the appliance may include an alignment mechanism to assist in aligning their respective inductors to maximize power transfer.

According to another object of the invention, capacitors are provided for each primary inductor to balance the inductance thereof.

In accordance with the invention, a user could merely place the appliance such as a cordless power tool, laptop computer, or recording device on a table, shelf or other common storage member and the charging process occurs automatically, regardless of the orientation of the receiver relative to the charging source. This would result in the appliance being charged whenever it is not in use, rather then merely resting on a work table between uses as in current practice.

The unique assembly of the present invention assures that the transfer of inductive power will occur regardless of the orientation of the appliance relative to the charging source. To achieve this result, the source may be configured with a number of coils that are arranged in predetermined positions that optimize the transfer of power to the appliance for certain applications such as a maximum duty cycle, i.e., power transfer density, or minimum obtrusiveness.

BRIEF DESCRIPTION OF THE FIGURES

Other objects and advantages of the invention will become apparent from a study of the following specification, when viewed in the light of the accompanying drawing, in which:

FIG. 7 is a diagram showing the arrangement of inductors of the power transfer device and of an appliance to form a transformer;

FIGS. 8 and 9 are front and side views, respectively, of an embodiment of the invention being activated by an appliance;

FIG. 10 is a diagram of a further embodiment of the invention including annular contacts thereof;

DETAILED DESCRIPTION

The invention relates to an induction power transfer device which is operable to charge a cordless battery powered appliance such as a hand tool, laptop computer, music player, or the like. In its broadest sense, the invention is a universal inductive interface power connection system including both a powered "source" and a cordless "receiver" which can be used together to transfer power from the source to a variety of receivers for charging the same.

Figure 1:
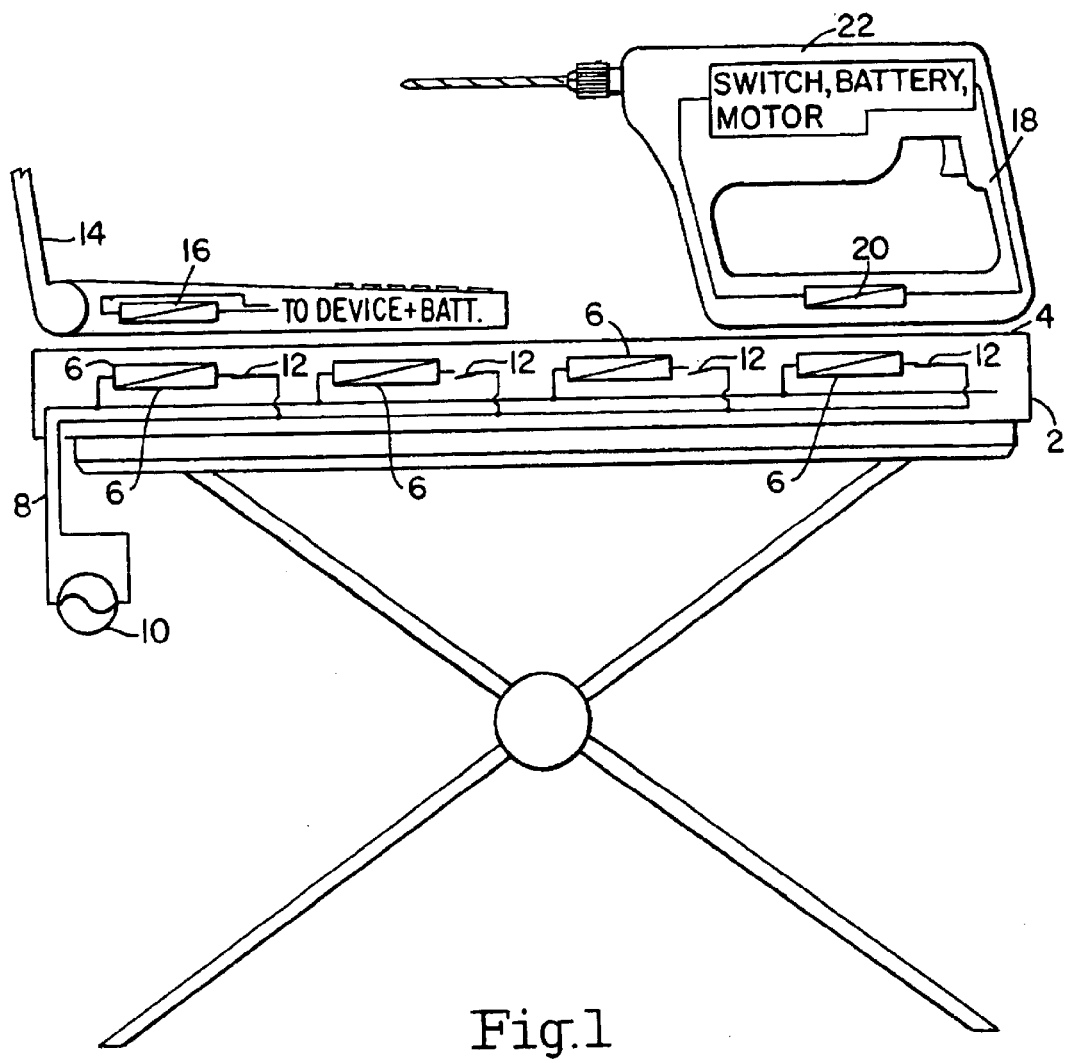
FIG. 1 is a front plan view of an induction power transfer device in the form of a table in accordance with the invention.

The induction power transfer device includes a housing which may take one of several forms. In FIG. 1, the housing comprises a bench or table 2 having a flat upper surface 4. Beneath the surface is a planar array of inductors 6 which operate as the primary inductors of one or more transformers. As will be developed below, each inductor comprises a coil having a longitudinal axis. A magnetic core may be provided for each coil.

The inductors 6 are connected with an electrical conductor 8 which in turn is connected with a power supply 10. In addition, an electrical switch 12 is connected between each inductor 6 and the conductor 8 so that the primary inductors can be selectively activated. For example, in FIG. 1, four inductors 6 are shown, but only the first and fourth have their switches closed to supply power thereto for activation.

Resting on the top surface 4 of the table 2 are two appliances, namely, a laptop computer 14 having a secondary inductor 16 and a cordless drill 18 having a secondary inductor 20. When the secondary inductors 16, 12 are aligned with primary inductors of the power transfer table 2, power is transferred from the table to the appliances, i.e., the laptop computer 14 and the drill 18 via transformers defined by the adjacent primary and secondary inductors. This power can be transferred to a battery in the appliance to charge the battery in order to power the appliance. Thus, for example, as represented by the block 22 in the drill 18 of FIG. 1, power from the secondary inductor 20 is supplied to a battery. A switch then activates the motor of the drill for operation.

It will be appreciated by those of ordinary skill in the art that the housing may take many shapes. For example, it can be formed as an elongated strip or pad on which an appliance may be rested, or a tool belt against which a power tool can be suspended. With the invention, any time an appliance is not in use, it can be rested or placed on the power transfer housing and recharged owing to the proximity of the primary and secondary inductors.

Figure 2:
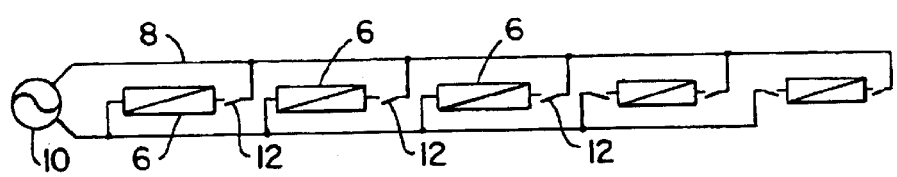
FIGS. 2–5 are circuit diagrams, respectively, showing various ways in which a plurality of inductors is connected in the induction power transfer device according to the invention.
Figure 3:
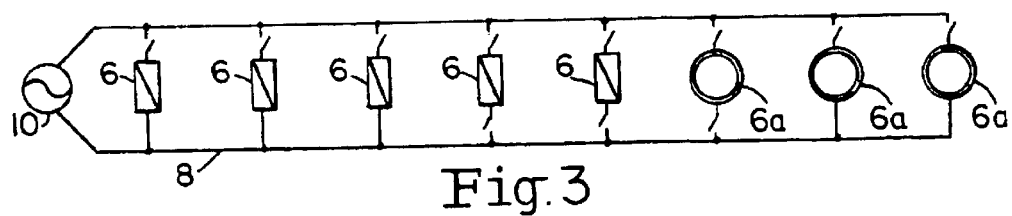
Figure 4:
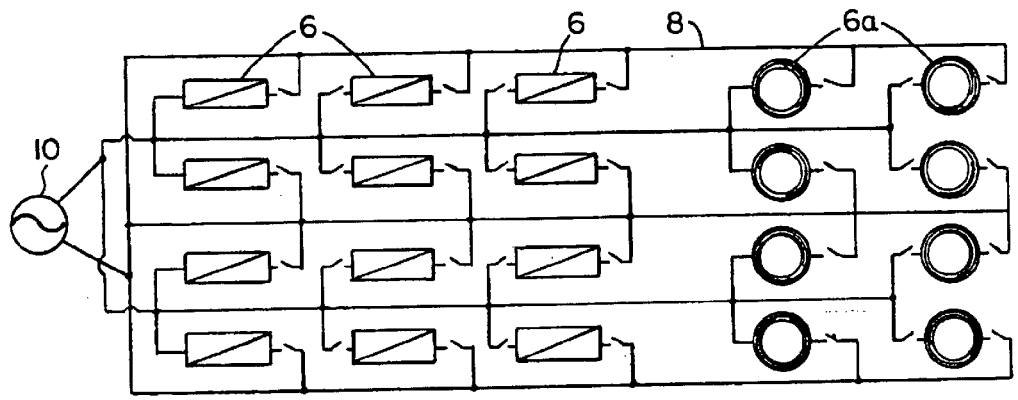
Figure 5:
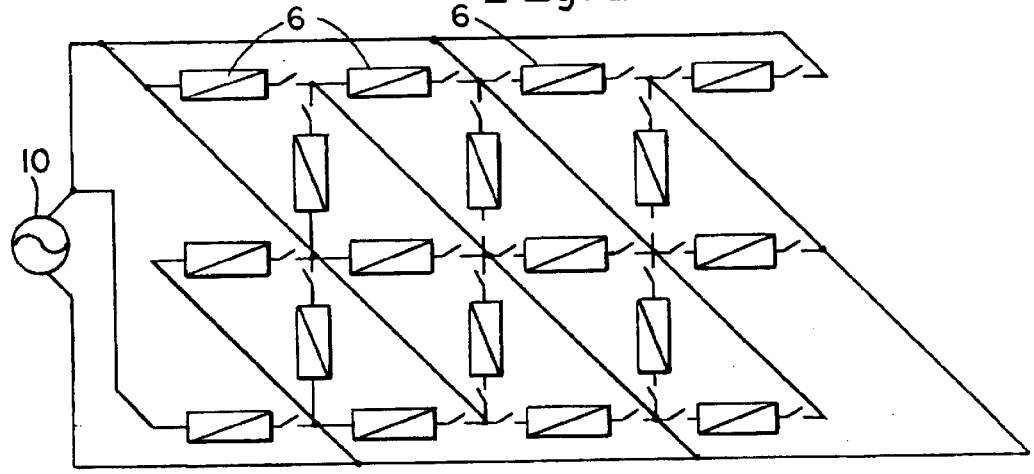

Referring now to FIGS. 2–5, the inductors 6 can be arranged in various patterns to insure charging of an appliance regardless of the position of the appliance on the housing on the power transfer device. In FIG. 2, a plurality of inductors 6 are connected in series with a source 10. In FIG. 3, some inductors 6a are arranged with their longitudinal axes normal to the axes of the inductors 6, with all of the inductors arranged in the same plane. FIGS. 4 and 5 show additional arrays of inductors in series and square configurations, respectively.

While the drawings illustrate a fixed number of inductors, it will be appreciated that the invention is not so limited and that any number of inductors may be provided to define an array as large as the housing in which it is arranged.

Preferably, the power transfer device inductors are arranged as close as possible to the inside surface of a protective wall of the housing (FIG. 1) which should be thin enough not to unduly separate the source and receiver inductors and thereby diminish the ability to transfer power to the receiver resting on the cover. Advantageously, the multiplicity of source inductors is connected in parallel to pairs of supply lines, which pairs of liens extend to the power supply via interposed coil switches to allow only those coils in proximity to the receiver to be selectively energized.

Figure 6:
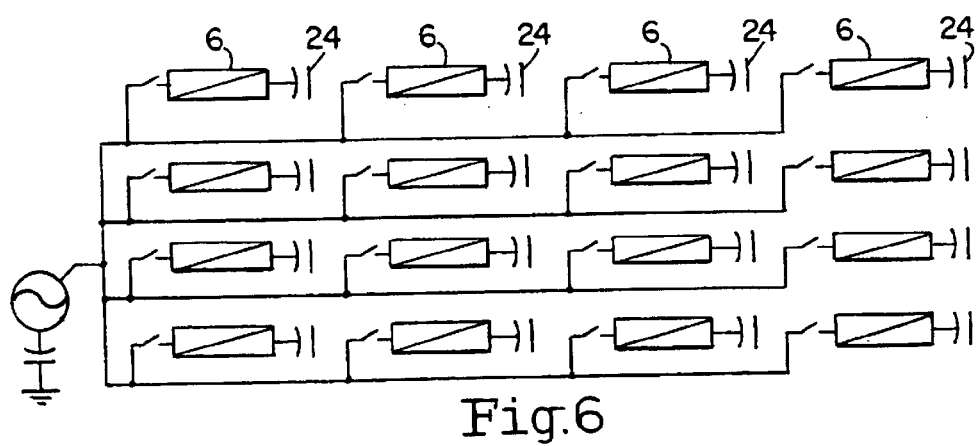
FIG. 6 is a circuit diagram of the induction power transfer device including capacitors for inductors.

In an alternative arrangement shown in FIG. 6, the source coil is energized through a single supply line provided one coil lead is connected to the line and the other lead coil is connected to a capacitor 24. To maximize power transfer, sufficient capacitance may be needed in series with each inductor to keep the current in phase with the voltage. Accordingly, capacitors are arranged relative to the interface when the appliance and the source are in mating positions so as to provide capacitive coupling for additional power transfer. Such transfer may be weak relative to the inductive transfer generated between the primary coils mounted in the source and the secondary coils mounted in the appliance.

As stated above, the source inductors may be oriented parallel or normal to the array plane. The inductor coils may include a compressed portion extending substantially parallel to the mating surface (similar to the flat portion of the letter "D" as shown in FIG. 7) to increase magnetic permeation from the source to the appliance. Alternatively, the coil cross-section may be customized to follow the contours of the mating surface to maximize permeation. The coils may take the form of an air coil or may have iron and/or other material extending through the core to improve transmission of the field lines between the source and the appliance.

The core of the inductors may be formed of magnetically permeable fibers, threads or tubes in air or oil or a binding matrix which could consist of a viscous fluid or elastomer either of which could be designed to soften as the air temperature around the coil rises. This would result in the magnetic core fibers migrating into the most efficient configuration for transmitting power through the interface with the appliance, while avoiding the potential inconvenience of a fluid filled array. It will be readily appreciated that, by choosing a matrix configuration which has some compressive strength when not heated by the presence of an operating interface, the coils within the cord or other array may be protected against crushing when subjected to transverse forces. Alternatively, the core matrix could be fluidized by the presence of the electrical or magnetic activity at the interface between the source and the appliance, such as by a magnetic core fiber being non-aligned with the field lines of the interface, which tends to generate more heat than an aligned core. The fluid core arrangement allows the cores to configure themselves into the most efficient configurations with respect to any established interface configuration, by curving toward the mating surface end of the coils.

The inductors mounted in the appliance should be embedded near the surface of the device that comes in proximity with the source pad or table as shown in FIG. 1. For example, the inductor coil(s) may be embedded near the bottom surface of a laptop computer for inductively coupling with any source array mounted in a seatback tray on an airplane, train computer table, etc. This would allow the laptop to be recharged while resting or in use. In a similar manner, a power tool may include a coil array positioned adjacent to a surface of the tool that would conveniently rest on the source pad, thereby allowing the tool to recharge while laid to rest.

To assure that the appliance will recharge no matter its orientation relative to the source array, it is preferable that the appliance include a set or plurality of inductors, i.e., solenoid coils with some arranged parallel and some arranged normal to the surface of the source pad. When the coils are arranged parallel to the surface, they have a dispersion of x-y orientations such as a tessellated polygonal or square grid, so that at least some of the appliance and source coils are in alignment with each other to allow efficient inductive coupling between the source and the appliance.

In FIG. 7 is shown a further embodiment of an inductive power transfer device 102 for an appliance 104. The device 102 includes separate coils 106, 108, with the coil 106 having a magnetic core 110 contoured to the core 112 of a secondary coil 114 of the appliance. Each primary coil 106, 108 also includes its own power source 116, 118 in lieu of a switch for activating the coil.

Rectification can be provided to each lead from each coil in the form of a pair of diodes 120 of opposite polarity on each coil lead with the output of each diode feeding the appropriate side of the battery. In this embodiment, each increment of power generated in any secondary coil in each inductive cycle caused by the power supply will be captured. For ease of manufacturing, all output leads from the diodes of one polarity could go "up," i.e., in the +z direction relative to the x-y plane of the array to contact an essentially planar bus such as used in a PC board comprising the inner side of an appliance array. The other polarity diode output leads could go "down," i.e., −z to a similar bus positioned on the outer side of the receiver cavity.

It is desirable for the source coils to only operate when an appliance is laid to rest on an item containing the source coils. By preventing the source coils from continuously generating an electromagnetic field, the system would conserve power while eliminating objecti9onable electromagnetic fields. This result is achieved by the switches 12 (FIGS. 2–5) provided so that each source or primary coil is energized from the power supply only when a secondary coil is within effective range and there is sufficient translational and rotational alignment between primary and secondary coils.

Referring to FIG. 7, this arrangement can be achieved by residual permanent magnetism in the appliance 104 or by a separate magnet 112 associated with each secondary coil 114 which operates a magnetic switch, a MOSFET, or similar switch (not shown) to turn the source coil on or off. Alternatively, the coils could be selectively energized by a resonance created between the primary and secondary coils which resonance amplifies a tiny residual power flow in each source coil. A further means for controlling energization may include a piezoelectric, or other oscillator in a tuned circuit pumped by random vibrations which generates feedback amplification when in proximity to a matched oscillator, thus opening a power transistor and/or OP-AMP between the coil and supply line once a threshold is reached. The coil switch (including transistor and/or OP-AMP) could also be operated by any kind of tag such as a microchip associated with each receiver coil which could generate its own signal (acoustic, radio, etc.) or respond to a polling signal from a matched device associated with each source coil.

In the alternative embodiment of FIGS. 8 and 9, a continuous source coil 202 with multiple leads or taps 204, i.e., at regular intervals going to the supply line, up to the limit of one lead (or tap) per coil going to each side of the power supply 208 can be provided. A coil switch is on every lead so that whatever length of source coil is in range of the receiver coil is activated. A continuous integrated circuit coil switch ("CICCS") may take the form of a ribbon or strip of a magnetoreactive semiconductor, possibly organopolymeric in nature, which goes into its conductive mode when in the presence of a magnetic field emanating from a secondary coil 210 in close proximity. In one embodiment, a magnetic north responsive CICCS is deployed to be in continuous contact with one supply conductor and each coil tap connected to the N-CICCS so that power from the supply conductor must traverse the width of the N-CICCS to reach the tap. A south (magnetic) responsive CICCS is similarly deployed between the coil taps and the other source conductor. When a secondary coil with a permanent magnet 212 as its core is positioned at a position wherein the magnetic fields interact, the N end of the core magnet opens the N-CICCS and the S end of the core magnet opens the S-CICCS, wherein the points of opening of the N-CICCS and the S-CICCS are separated by exactly the length of the receiver inductor whose core magnet opened the two CICCs, forming a circuit from one supply line to the other supply line that extends through the corresponding segment of the source inductor coil or a single CICCS could be used in the single lead with a capacitor scheme. Alternatively, the CICCS could be opened by other conventional devices.

The power supply 208 for generating the electromagnetic field in the source inductor coils may be either AC or intermittent DC, such as half-wave rectified. The power supply may vary at line frequency (60 or 50 Hz.) or a power supply with a higher frequency oscillator may be employed. The inductive power transfer is proportional to dv/dt, minus losses to self inductance, which increase with increase in frequency.

In another preferred embodiment of the present invention shown in FIG. 10, maximum transfer of power is achieved by allowing the coils forming either the primary 302 or the secondary 304 to move relative to the other set of coils. If one set of coils is allowed to move, i.e., to translate as much as one-half or more of the intercoil spacing in either the x or y direction or both and to rotate as much as one-half of the intercoil angle or more in either direction about the z axis so that via an engagement alignment device such as a core magnet the coils or arrays can achieve maximum alignment when forming a coupled transformer. To achieve this result, the movable coils or arrays may be set in a non-conductive container or lozenge 306 preferably having an annular configuration with connections provided either by flexible wires, or by brushes and concentric commutators on the lozenge body designed to exclusively contact the appropriate brush. Alternatively, the upper and lower surface of each inductive coil/array-lozenge may functionally serve as the output brushes for the secondary inductor coils or arrays, which brushes transmit any power generated to the upper and lower internal surfaces of the cavity in which the inductor coil/array lozenges are free to move transitionally and rotationally. These surfaces 308 serve as sliding contacts or commutators, collecting power from the secondary coils and sending it to the device's battery, switch and end user circuitry.

The secondary and/or ssource coils could also take the shape of flexible coils which are free to bend and migrate within a cavity formed in either the source or appliance device. Alternatively, the flexible coil may be free from the constraint of any cavity, so as to best align with its mating coil. Motion of the coils (within or without their cavities) is facilitated by a vibrator which is briefly energized when a coil-switch is opened, with the vibrations making it easier for the coils to migrate into alignment with each other and/or by an active seeker mechanism (FIGS. 11 and 12) attached to the coil. The vibrator could be periodically energized. It and the seeker are also usable with any other form of the inductor coils.

Figures 11, 12:
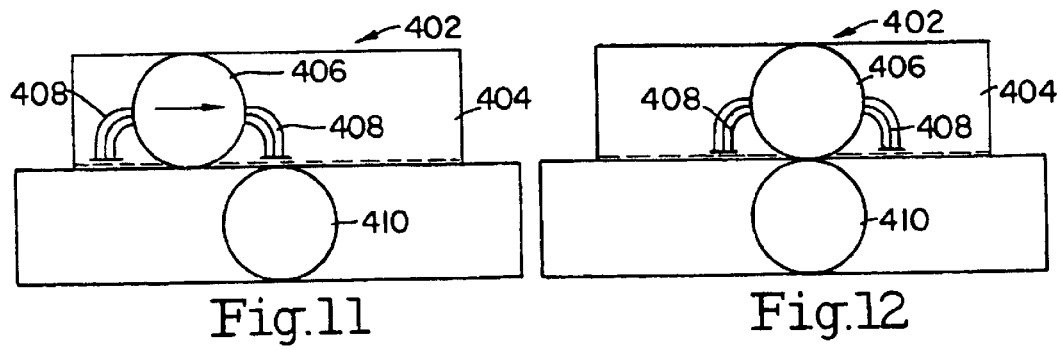
FIGS. 11 and 12 are sectional views showing movable inductors in an appliance for alignment with an inductor of the induction power transfer device.
Figure 13:
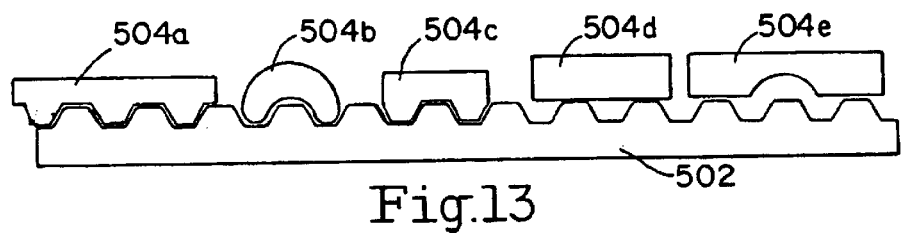
FIG. 13 is a diagram showing an alignment mechanism of the invention.

The seeker mechanism 402 is attached to any movable source or appliance inductor which mechanism is designed to bring the primary and secondary coils into ideal alignment for inductive coupling. In FIGS. 12 and 13, the appliance 404 has the movable coil 406. This may be achieved by means of a piezoelectric or piezomagnetic leg 408 extending from each side of the movable inductor 406 to contact the inner side of the mating surface which is designed to flex (under influence of the electric or magnetic flux at the interface) in a direction which will move the inductor into alignment with the primary coil 410 as shown in FIG. 12. The legs may be made of materials of opposite polarity in the dorsal and ventral region to cause lateral motion. Furthermore, end portions of the legs may need to have a biased grip to engage the mating surface. Alternatively, the lower leg portions may have a coefficient of friction which varies with the variations in electric or magnetic fields. As a result, the lower portions of the legs grip the mating surface more strongly during that phase of the motion which would bring the coil into alignment. This may apply to a mobile discrete inductor or a flexible inductor which could be arrayed in their space in an "s" curve to allow motion of the central portion or other arrangement.

An advantageous form of inductive interface system shown in FIG. 13 includes bumps or waffles formed in the exterior surface of the source pad 502, which bumps correspond to locations of a source coil or array. The bumps or waffles would mate with indentations in the cover of the appliance coil or array 504a–e so as to provide a simple system of aligning the mating coils resulting in high interface efficiency. The system of bumps and indentations might be positioned with one bump located at each end of each coil, or a pair of bumps on either side, or any other suitable arrangement. The source array is preferred for the bumps, as indentations would tend to accumulate sawdust or the like from the workplace which could impede inductive coupling efficiency. The ideal system of bumps and indentations is envisioned as having the cross section of the upper half of a sine wave, so that a receiver array will sit casually on a source array and will tend to rotate and translate under the influence of gravity and/or magnetic or other attraction into maximum alignment. By proper sizing and spacing of the bumps into a shape similar to the sinusoidal undulating wave form of array, a good degree of interoperability may be achieved.

For power tools and other uses requiring larger amounts of power, a grooved form of source and receiver array may be employed, wherein the surface is described by a sinusoid undulation (possibly flattened on tops to allow interface with flat surfaced interfaces) with the coils disposed in the convex portions of the sinusoid. This arrangement assures that when sinusoidal powered source and appliance arrays are located proximate to each other, inductive interaction of source and appliance coil arrays is maximized. Sinusoids could be transverse to each other, such as in a power tool power cord/strip so as to facilitate rolling up of cord/strip, or longitudinal (if such axes are identifiable).

Another form of inductive interface system formed in accordance with the present invention may consist of a source array disposed on the end of an extension cord which would engage with a secondary array disposed on a power tool or other device. This could provide power for 100% duty cycle even with the heaviest of usage, and yet be readily disconnected at any time, merely by manually applying tension, or via one of the disengagement devices discussed hereabove. Another form of the invention includes a small table/toolrest with source arrays in the surface, with the table having extendable legs that allow the table to be positioned where needed.

A major feature of the "Universal Inductive Interface Power Connection System" comprising the present invention resides in the fact that while configurations and densities of source and appliance arrays may be optimized for different applications, different sources and receivers are at all times interoperable. For example, a flat surfaced array may be employed with a sinusoid surfaced array and vice versa. As a general rule, the maximum current available for power transfer will be a function of interface area, inductor density and the coupling efficiency factor. With a standardized source coil density, the secondary array maximum voltage will be a function of appliance coil density, as in any transformer.

Figure 14:
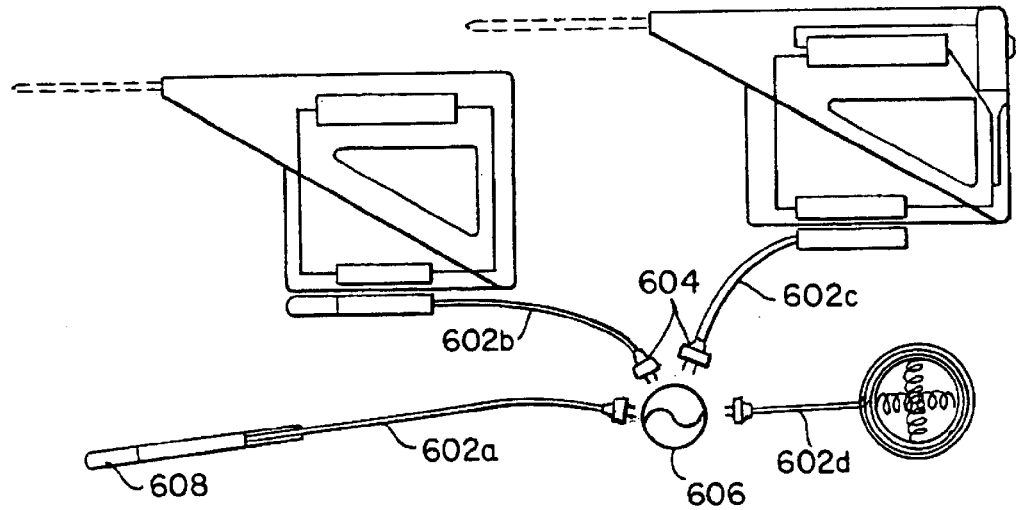
FIG. 14 is a diagram illustrating a further embodiment of the invention for simultaneously charging a plurality of appliances.

Referring to FIG. 14, all forms 602a–d of the source array which might be desirable on a job-site or in a home or office, would have both a plug 604 for receiving power from wall socket or other source 606 and a socket 608 or more so that other forms of course array may be connected togther to provide a broad spectrum of recharging possibilities. For example, a long power cord array could stretch the entire expanse of a job-site, providing recharging opportunities along its entire length for a modest rate of recharging, and forms of source arrays such as a pad comprising the upper surface of a shelf of a work table could be connected to and derive power from the conductors of this power cord. This would provide faster recharging than otherwise available. It would also provide efficient recharging at locations on the job-site of heaviest tool use. Source pads or other containers for the source inductor coils employed in the charging system of the present invention may advantageously be set upon tables, workbenches, saw horses, shelves or the like to relieve the worker of the current necessity of bending over each time it is desired to put down or pick up a tool from the ground, which is customary practice at most construction sites. A single source inductor array located on an extension cord may be connected at another location, with a sinusoidal undulating source array at another location and a bump array at another, to provide additional recharging opportunities. The different source arrays could also transfer power to each other through their inductive interfaces. Thus, there would be no further need for a conventional plug and socket connection to recharge the device.

It is preferable to provide for positive engagement between the receiver and the source. This may prove useful when the source is positioned other than in a horizontal position and when the interface is subjected to vibration or jostling, since it produces a tighter magneto-inductive coupling (between source and appliance) by ensuring the best proximity and/or alignment of coils. This, in turn, helps overcome possible magnetic repulsion between the coupled sets of source and appliance inductors. This desirable result may be achieved by provision of a magnet, e.g., a permanent magnet, in the center or edge of each repeating coil unit of the appliance or source coils to mate with another magnet or magneto attractive mass positioned in the center or edge of each repeating coil unit of source or appliance coil, respectively.

The iron or other core material employed in each inductor coil has a sufficient degree of permanent magnetism to function as engagement devices, since these cores are ideally located for this purpose. In effect, the magnetic attraction is sufficient to open the coil switch and thus operate the charging system. However, it could be that the degree of permanent magnetism needed to align the coils is incompatible with the electro-magnetizability (permeability) required for the core to function efficiently in an inductor, in which case the alignment magnet may be set orthogonal to the inductor primary axis of the "x-y" plane, preferably mutually centered, as shown in FIG. 8.

If each coil has a degree of mobility at each of its ends approximately equal to half the spacing between coils, intercoil spacing will allow the pairs of coils to assume alignment. Such mobility of the coils can be achieved by using braided wires in the coil connections and a housing larger than the diameter of the coils. This allows the coils to slide in the x-y plane, wherein one surface of the housing is the interface surface of the source array. Alternatively, Velcro® mating tongues and grooves in the source and receiver or mating physical structures may be employed as engagement members. In each of these embodiments, the fact that the housing is larger than the size of the coils makes it possible for the pairs of coils to achieve proper alignment. Alternatively, the housings for the source and appliance arrays could be magnetically attractive to each other.

Once the source and appliance coils are brought in proximity with each other, a disengagement device may be required to break the electromagnetic bond. Disengagement may be effected by physically moving the appliance away from the source, reducing the magnetic coupling. Alternatively, if a magnet functions as an engagement device, it could be mounted in an opening in the appliance such that the magnet could be moved within the appliance away from the source, in the z direction away from the interface, thereby reducing the magnetic force of engagement. This movement could be achieved mechanically by the squeezing of a trigger in the appliance, or electrically through a trigger switch. Alternatively, a contact detector responding to a user's touch could be employed. The detector actuates a solenoid connected to the engager, pulling away from the interface. Disengagement is achieved by sending a back voltage through any activated secondary coils, so as to generate a repulsive magnetic force against the primary coils. Alternatively, a forward voltage could be sent through the activated receiver coils if the inductive coupling generates a net repulsive force which in operative engagement must be countered by the attachment system, thereby increasing the repulsive force in the inductive coupling and overcoming the attachment force.

So as not to waste power in systems where primary coil to secondary coil alignment is not assured, either the theoretical maximum voltage output of the appliance array should be higher than the desired output by a factor inverse to the cosine of the greatest operational misalignment of a coil-set and any excess voltages diverted and added with other excess voltages from other coil sets and input to the appliance, or the secondary coils can be multitapped, with the tap producing optimal voltage automatically selected by a trimmer circuit. Alternatively, the maximum theoretical output voltage can be set equal to a desired input voltage, and voltage multiplier circuits used to increase any low voltages resulting from any misalignment. Exact voltages are achieved by using conventional means, i.e., variable resistors, to split the original voltage, only multiplying a portion of it, which is added back or by any conventional arithmetic circuit.

It may be desirable to include a battery/fuel cell overcharge prevention circuit, which would operate to disable the system either by electrically isolating the engaged secondary coils or, preferably, by turning off the coil switches of any source coil actuated due to secondary coil proximity. Alternatively, the secondary coils could be physically relocated within the body of the appliance, to reduce magneto-inductive interaction.

A rechargeable fuel cell system may be employed with the inductive interface as the recharging device, wherein the secondary array in the powered device will, after receiving power from a source array, cause the fuel within the fuel cell to be regenerated from the oxidation products of the fuel cell's operating reactions. For example, in a hydrogen fueled system, the hydrogen fuel for the fuel cell would be stored in the form of a metal hydride, a saturated graphite or fullerance (possibly doped with electrophiles such as lithium and/or electrophos), or compressed gas, which in the absence of power from an inductive coupling of the secondary array, would react with atmospheric oxygen to produce electricity and water. The water would be stored and the electricity used to power the device. When later connected to a source power array and receiving power through inductive coupling, the stored water would be reduced by hydrolysis using electric power from the inductive coupling into hydrogen which would be stored in the above cited storage device, and oxygen which would be released to the atmosphere. If the system lost its hydrogen, it could be replaced as water, and hydrolysis would occur as stated above through the inductive power transfer, to put the fuel cell system back into a charged condition.

In a preferred embodiment of the present invention, a power tool having one or more inductive secondary coils formed in accordance with the present invention may be laid to rest on either side on a source pad having an array of built in primary coils. Secondary coils are positioned in the bottom and/or along the sides of the tool, or may be located in the bottom of a battery pack which itself may be detached and replaced. Whether the secondary coils are mounted in the power tool or in an attachment to the tool, by positioning the power tool with its interface (inductor secondary array) on a source pad or similar receptacle including the source inductor array, it becomes possible to charge the power tool between operations, merely by placing the tool on the source pad, thus maintaining a sufficient charge in the power tool at all times. The extra batteries or fuel cells could be recharged on the same source array.

For extremely severe use, the source array could be set on an incline so that exhausted batteries would be set at the top of a sequence of batteries on the incline, and the battery which has charged for the longest period of time could be withdrawn from the bottom of the incline.

A job-site source array might take the form of a coilable flat power cord ribbon about ½-inch thick by 2–6 inches wide by any length from 2–100 feet. Workers conveniently lay their tools on the ribbon when not in use. The edges could be tapered to prevent tripping. One end ribbon may have a cord adaptable to being plugged into a conventional electric outlet. It could also have sockets into which may be plugged other appliances and source arrays. The flat power cord ribbon could have a central stripe of ferrous material with a separate strip of source coils complete with coil switches and supply conductors on either side. The ribbon would be designed to mate with a receiver array consisting of polygonal cells of diameter equal to the spacing of the two strips of source coils, composed of secondary coils with supporting circuitry and with a magnetic button at the center of each polygonal secondary array, thereby assuring good coil alignment.

In all instances in which an inductor has been described as being in the x-y plane, i.e., its longitudinal axis parallel to the plane of the interface, an inductor being in the z direction, i.e., its axis normal to the plane of the interface, may also be provided, and an inductive array may contain both parallel and normal inductors.

A signal can be transmitted through the same inductive array which transmits power from a source to an appliance by injecting the signal into the interface at an appropriate frequency through an appropriate filter and removing it on the other side of the interface through another appropriate filter. In this way, computers and all types of portable and non-portable devices can communicate when they are engaged through an inductive interface.

While the preferred forms and embodiments of the invention have been illustrated and described, it will be apparent to those of ordinary skill in the art that various changes and modifications may be made without deviating from the inventive concepts set forth above.

What is claimed is:

1. An inductive power transfer device for an appliance, comprising
   (a) a housing;
   (b) at least one primary inductor arranged in an array within said housing;
   (c) means for connecting said primary inductor with a power supply; and
   (d) at least one switch connected between said primary inductor, respectively, and said connecting means, said switch being operable to selectively activate a respective primary inductor, whereby when an appliance having a secondary inductor is placed on said housing, power is transferred to the appliance via a transformer defined by said primary inductor and the secondary inductor 2. An inductive power transfer device for an appliance, comprising:

(a) a housing;

(b) at least on primary inductor arranged in an array within said housing;

(c) means for connecting said primary inductor with a power supply; and (d) at least on switch connected between said primary inductor and said connecting means, respectively, said switch being operable to selectively activate a respective primary indictor, whereby when a appliance having a secondary inductor is placed on said housing, power is transferred to the appliance via a transformer defined by said primary inductor and the secondary inductor;

wherein at least one of said primary inductors has a longitudinal axis arranged normal to the longitudinal axis of other primary inductors.

3. The apparatus as claimed in claim 2, further comprising a capacitor connected with each of said primary inductors.

4. Apparatus as claimed in claim 3, and further comprising a power source connected with connecting means, and a capacitor connected between said power source and ground.

5. The apparatus as claimed in claim 2, wherein said housing has a thin top wall, said primary inductors being arranged adjacent to said top wall for defining transformer with a secondary inductor in an appliance resting on said top wall.

6. Apparatus as claimed in claim 5, wherein said top wall is flat and said primary inductors are arranged in a plane parallel to and below said top wall.

7. Apparatus as claimed in claim 5, wherein said primary inductors each comprise a coil wound about a magnetic core.

8. Apparatus as claimed in claim 7, wherein said each of said magnetic cores include a flattened portion adjacent to said top wall, whereby said primary inductors match a configuration of corresponding secondary inductors in an appliance and retain the appliance on the housing surface.

9. Apparatus as claimed in claim 5, and further comprising means for aligning at least one of said primary inductors with a secondary inductor in the appliance.

10. Apparatus claimed in claim 9, wherein said housing top wall contains a plurality of projections for mating with recesses in a bottom wall of the appliance to align the appliance secondary inductor with at least one of said primary inductors.

11. Apparatus as claimed in claim 9, wherein said alignment means adjusts the orientation of said primary inductors relative to said housing.

12. Apparatus as claimed in claim 11, wherein said primary inductors each comprise a coil wound about a magnetic core and having end portions which move in response to the presence of and in alignment with a secondary inductor in the appliance, the secondary inductor also including a magnetic core having a coil wound thereon.

13. An electrical appliance comprising:

(a) a housing;

(b) means arranged in said housing to provide power to the appliance;

(c) a plurality of secondary inductors connected with said power means; and (d) switching means connected with each of said secondary inductors for controlling the transfer of energy from said secondary inductors to said power means.

14. An electrical appliance as claimed in claim 13, wherein said secondary inductors have an annular configuration and are coaxially arranged, each of said inductors being interconnected and movable relative to an adjacent inductor in response to the presence of a primary inductor to align said secondary inductors with said primary inductors.

15. An electrical appliance as claimed in claim 14, and further comprising a sliding annular contact connected with said secondary inductors, the longitudinal position of said contact defining which of said inductors are free to move for alignment with said primary inductors.

16. An electrical appliance as claimed in claim 13, wherein said secondary inductor is movable within said housing for alignment with a primary inductor of the power transfer device.

17. An inductive power transfer device for an appliance, comprising:

(a) a source housing;

(b) at least one primary inductor within said housing;

(c) means for connecting said primary inductor with a power supply;

(d) at least one secondary inductor within said appliance; and (e) non-mechanical coil mobility means to move at least one of: at least of said primary inductors within said housing or at least one of said secondary inductors such as to increase electromagnetic alignment between said at least one of said primary inductors and said at least one of said secondary inductors.

18. The apparatus of claim 17, wherein said inductor alignment means includes at least one core magnet.

19. The apparatus of claim 17, wherein at least one of said primary or secondary inductors is a flexible coil.

20. The apparatus of claim 17, wherein the motion produced by said movement means is facilitated by a vibrator.

21. The apparatus of claim 17, wherein said movement means comprises piezoelectric means.

22. The apparatus of claim 17, wherein said movement means comprises magnetically permeable fibers.

23. The apparatus of claim 17, wherein only at least one of said primary inductors within said housing moves.

24. The apparatus of claim 17, wherein only at least one of said secondary inductors within said appliance moves.

25. The apparatus of claim 17, wherein both at least one of said primary inductors and at least one of said secondary inductors moves toward electromagnetic alignment with respect to each other.

26. An inductive power transfer device for an appliance, comprising:

(a) a source housing;

(b) at least one primary inductor within said housing, each said inductor comprising a plurality of physically separated coil means;

(c) means for connecting said at least one primary inductor with a power supply;

(d) at least one secondary inductor within said appliance;

(e) sensing means to detect those coil means which are in effective presence of a magnetic field emanating from said at least one secondary inductor; and (f) switching means to provide sufficient power to said detected coil means to cause current to flow from said at least one secondary inductor.

27. An inductive power transfer device for an appliance, comprising:
  (a) a source housing;
  (b) an array of primary inductors, said array comprising either (i) at least one plane of primary inductors, each said plane comprising either at least one first inductor positioned at a certain angle and at least one secondary inductor positioned at a different angle; or (ii) a plurality of planes of primary inductor, each said plane comprising a plurality of inductors positioned at a certain angle different from the angle of the other respective planes;
  (c) means for connecting said at least one plane of primary inductor with a power supply;
  (d) at least one secondary inductor within said appliance, and wherein said at least one secondary inductor receives energy from at least a portion of said array of primary inductors.

28. The apparatus of claim 27 further comprising:
  (A) sensing means to detect those inductors of said primary inductors which are in effective presence of a magnetic field emanating from said at least one secondary inductor; and
  (B) switching means to provide sufficient power to said detected inductors of said primary inductors to cause current t flow from said at least one secondary inductor.

* * * * *